US011178068B1

(12) United States Patent
Etler et al.

(10) Patent No.: US 11,178,068 B1
(45) Date of Patent: Nov. 16, 2021

(54) CONNECTION MANAGEMENT SERVICE

(71) Applicant: Amazon Technologies, inc., Seattle, WA (US)

(72) Inventors: Samuel Rislove Etler, San Francisco, CA (US); Elizabeth Ann Dow Johnson, Tacoma, WA (US); Dionisios Spiro Vervitsiotis, Lynnwood, WA (US); Kamlesh Nanda, Bothell, WA (US); Kenneth I. Rawlings, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 16/455,573

(22) Filed: Jun. 27, 2019

(51) Int. Cl.
*H04L 12/927* (2013.01)
*H04L 12/923* (2013.01)
*H04L 12/64* (2006.01)

(52) U.S. Cl.
CPC ........ *H04L 47/808* (2013.01); *H04L 12/6418* (2013.01); *H04L 47/762* (2013.01); *H04L 2012/6475* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,979,744 | B1* | 5/2018 | Casillas | H04L 63/1408 |
| 2014/0172706 | A1* | 6/2014 | Condry | G06Q 20/4016 |
| | | | | 705/44 |
| 2015/0163217 | A1* | 6/2015 | Lo | G06F 17/3053 |
| | | | | 726/6 |
| 2016/0050224 | A1* | 2/2016 | Ricafort | H04L 61/2007 |
| | | | | 726/23 |
| 2016/0337127 | A1* | 11/2016 | Schultz | H04L 9/3265 |
| 2018/0063178 | A1* | 3/2018 | Jadhav | H04L 45/74 |
| 2018/0121966 | A1* | 5/2018 | Schmidt | G06Q 20/102 |
| 2018/0293573 | A1* | 10/2018 | Ortiz | G06Q 20/3821 |
| 2020/0013062 | A1* | 1/2020 | Pratt | G06Q 20/367 |
| 2020/0092293 | A1* | 3/2020 | Liu | H04L 63/102 |
| 2020/0104852 | A1* | 4/2020 | Douglas, Jr. | G06Q 20/24 |

* cited by examiner

*Primary Examiner* — Yee F Lam
(74) *Attorney, Agent, or Firm* — Lee & Hayes, P.C.

(57) ABSTRACT

A technology is described for determining a trust score or trust metric used to determine whether to allow a connection to a high risk destination. In one example of the technology, a connection request to initiate a connection with a destination over a network may be received at a communication service. The communication service may identify a customer account associated with the connection request and obtain a trust score that indicates whether the connection request associated with the customer account may be allowed. The communication service may determine whether the connection request associated with the customer account is allowed to initiate the connection with the destination based on the trust score, and initiate the connection with the destination over the network when the trust score allows the connection request.

20 Claims, 9 Drawing Sheets

CONNECTION MANAGEMENT SERVICE

BACKGROUND

Voice-communication systems allow users who may be remote from one another to communicate over a communications network using an array of different devices. These voice-communication services may allow users to place telephone calls using an application hosted on a client device or a VOIP (voice over IP) phone, and send voice traffic via a private branch exchange (PBX) over the Internet and other networks, including a public switched telephone network (PSTN).

Premium rate telephone numbers are telephone numbers for telephone calls that incur a higher charge as compared to charges for calls to other telephone numbers. A telephone service provider charges the calling party a high rate and shares the revenue with the owner of the premium rate number. Although billing for premium rate telephone calls is different from standard telephone calls, routing of premium rate telephone calls is typically the same as standard telephone calls. Criminals may also use premium rate numbers to defraud unsuspecting users. As one example, a user may be induced to download dialer software that surreptitiously dials a premium rate number in order to accumulate charges on the user's phone bill without the user's knowledge.

DETAILED DESCRIPTION

Figure 1:
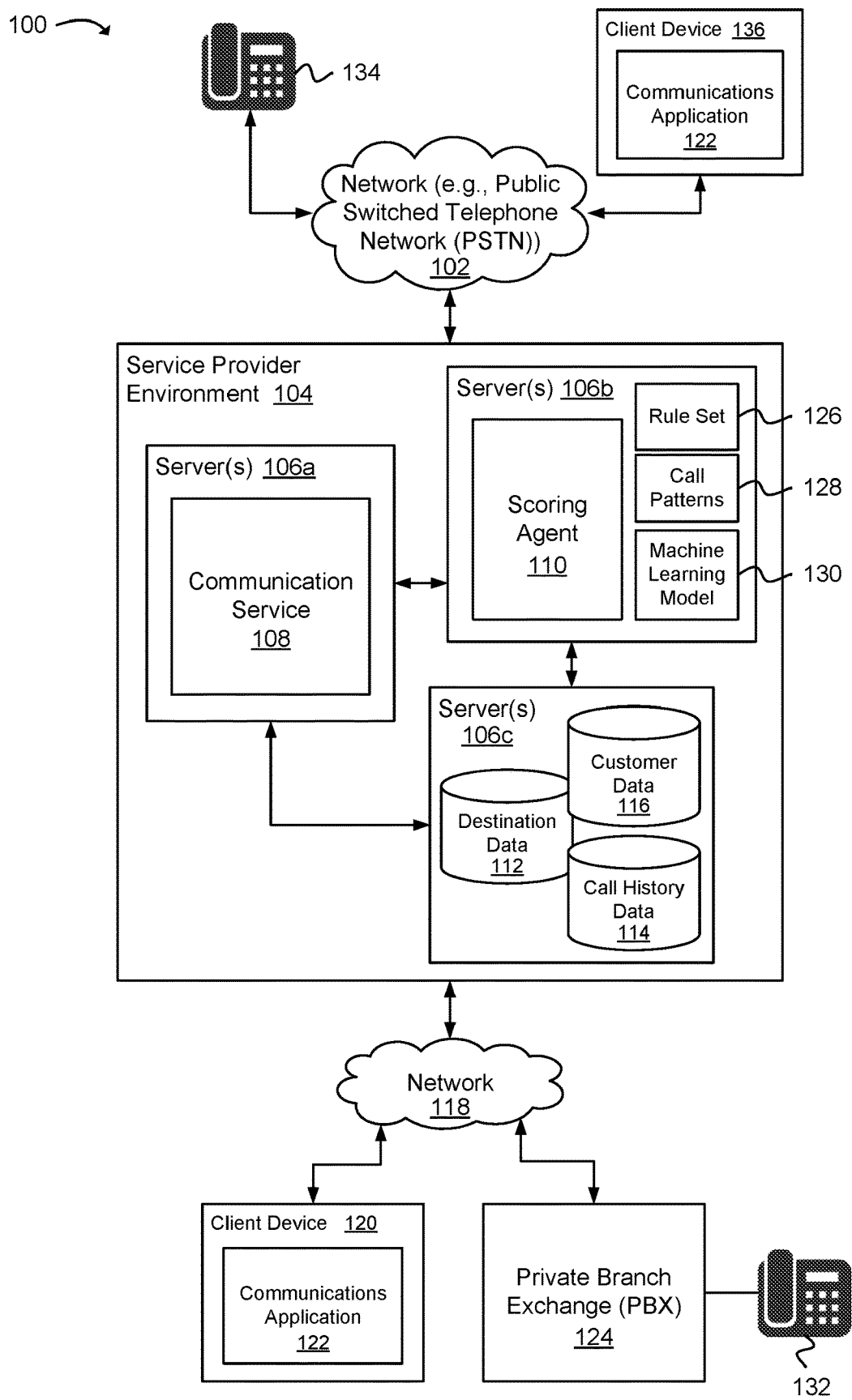
FIGS. 1 and 2 are block diagrams illustrating various example components included in a system for processing a connection request to a destination endpoint based on a trust score for a customer account.

Technologies are described for determining a trust score or trust metric used to determine a risk associated with connecting to a destination endpoint and whether, based on the trust score, to allow the connection, such as a phone call, to be established with the destination endpoint. A connection request may be for establishing a network connection between an origin endpoint and a destination endpoint, and the network connection may be for transmitting voice, video, audio, and/or text data between the origin endpoint and the destination endpoint over one or more networks, including a public switched telephone network (PSTN) and a packet switched network (PSN). As described herein, a destination endpoint may be defined by a phone number, network address, or other identifier assigned to a location or device. One risk associated with a connection request is connecting to a high cost destination endpoint which may include a premium rate number or international premium rate number that charges high rates to callers, or a non-premium rate destination endpoint which may charge higher fees relative to other non-premium destination endpoints. Another risk associated with a connection request is an unusually high number of calls made to a destination endpoint over a defined period of time, calls made outside of normal business hours, calls to unrecognized destination endpoints, calls for unexpected lengths of time (e.g. 8 hours), as well as other calls that appear to be suspicious or uncharacteristic of a customer. The technologies described herein can be used to help protect callers and service providers from incurring unexpected or fraudulent charges associated with calling a high risk or high cost destination endpoint, as well as mitigate damages associated with fraudulent calling schemes, by using a trust score to determine whether to allow a connection request to a destination endpoint.

In one example of the technology, a communication service may be configured to allow or deny a connection request to initiate a connection with a destination endpoint based on a trust score generated for a customer account. In one example, the communication service may receive a connection request associated with a customer account to initiate a connection (e.g., a voice, video, text, or data connection) with a destination endpoint. In response to receiving the connection request, the communication service may identify a customer account associated with the connection request and obtain a trust score (e.g., from a scoring agent) which indicates whether the connection request associated with the customer account is allowed. A trust score may be determined based in part on destination risk information, customer status information, customer call history information, and other information linked to the customer account, as described in greater detail later. In the case that the trust score indicates that the customer account is allowed to request the connection with the destination endpoint, the communication service may initiate the connection with the destination endpoint. In the case that the trust score indicates that the customer account is not allowed to request the connection with the destination endpoint, then the communication service may provide an indication or message sent to the caller that the customer account is not allowed to request a connection with the destination endpoint.

In another example of the technology, the communication service may be configured to determine whether a destination endpoint may be a high cost and/or a high risk destination endpoint, and obtain a trust score for a customer account when the destination endpoint is a high cost or high risk destination endpoint. For example, a risk score can be calculated for a destination endpoint and if the risk score exceeds a threshold, then the destination endpoint may be identified as a high risk destination endpoint, and a trust score may be obtained. The communication service may evaluate the trust score for the customer account to determine whether to allow a connection to the destination endpoint. For example, in response to a connection request to connect to a destination endpoint, the communication service may obtain cost information associated with connecting to the destination endpoint or obtain a destination risk classification assigned to the destination endpoint. If the communication service determines that the destination endpoint is associated with a high calling rate and/or risk of fraud, the communication service may obtain a trust score for a customer account associated with the connection request, and the communication service may evaluate the trust score to determine whether to allow the connection request.

Generating and evaluating a trust score may help prevent some types of fraud centered on calling high risk destination endpoints. For example, the public switched telephone network (PSTN) is a global network that allows calls to be placed to nearly any destination endpoint in the world. Countries and international entities may be assigned unique country calling codes, and phone numbers may be assigned within the calling codes. Rates charged per minute to call a given destination endpoint may be complicated and variable, such that while a customer might expect a single cost to call a specific country, there may be more granularity to the cost that adds hidden fees to the cost. Within a specific country calling code, there may be phone number blocks that are much more expensive to call than other phone number blocks, such as premium rate numbers. Premium rate numbers may be associated with a type of fraud called International Revenue Share Fraud (IRSF). As part of IRSF, a phone number may be provisioned to an entity that provides the entity with a monetary payment each time the phone number is called. Entities committing the fraud may hijack a telephone system and place automated calls to the entity's phone number surreptitiously, thereby generating revenue for the entity.

One technique for avoiding IRSF may be to automatically block calls to destination endpoints known or suspected to be high risk destination endpoints. However, in some situations, there may be a legitimate reason to call a high risk destination endpoint. For example, a mining company may have a legitimate need to call a satellite phone to communicate with scientists who may be in the field. Manually disabling automatic blocking of calls to high risk destination endpoints for specific entities, such as a mining company who has a need to call high risk destination endpoints, may be feasible on a small scale; however, manually disabling automatic blocking of calls to high risk or high cost destination endpoint in a large communication service system may consume a considerable amount of resources.

A destination endpoint can be categorized as a high risk/cost destination endpoint or an undesirable destination endpoint using various evaluation techniques. An evaluation technique can use a number of factors to determine whether a destination endpoint is considered a high risk destination endpoint, a high cost destination endpoint or undesirable destination endpoint, including, but not limited to, localized rate structures, overall pricing, and individual definitions of high calling rates provided by a customer and/or a service provider. As one example, calling rates (e.g., a rate sheet) for destination endpoints may be evaluated to identify destination endpoints that have substantially higher rates as compared to other destination endpoints on a rate sheet or in a defined geographic area. In one example, a threshold or percentage may be used to determine whether a rate for a destination endpoint may be substantially higher than rates of other destination endpoints. As a non-limiting example, destination rates that are above a rate threshold of, for example, $0.25, $0.35, $0.50 or higher may be considered substantially higher rates. As another non-limiting example, destination rates that are, for example, 25%, 30%, 50% or higher than other destination rates on a rate sheet or in a defined geographic area may be considered substantially higher rates. An average, mean, or median may be calculated for calling rates, and destination endpoints that are above the average, mean, or median calling rate may be categorized as high cost destination endpoints. However, in some cases, a rate that is substantially higher may not indicate that a destination endpoint is necessarily a high cost destination endpoint. For example, a service provider might charge $0.01 per minute while another service provider may charge $0.04 per minute and yet another service provider may charge $0.05 per minute. While the rates of the other service providers are hundreds of percent higher than $0.01 per minute, the rates may not be necessarily high cost. Therefore, in some cases, subjective analysis of individual calling rates for destination endpoints may be performed to determine whether a calling rate may be high cost. The technology described herein can be used to allow a customer of a service provider to call a high risk/cost destination endpoint based on a trust score generated for a customer account.

To further describe the present technology, examples are now provided with reference to the figures. FIG. 1 is a block diagram illustrating an example of a system 100 that may be used to process connection requests to initiate a connection with a destination endpoint over one or more networks 102. As illustrated, components of the system 100 may be hosted on servers 106*a-c* in a service provider environment 104, such as a "cloud" environment. The system 100 may enable customers of a service provider to place and receive calls using, in part, service provider computing resources. A call may include a voice call or data call that transmits data over a network 102 between devices associated with a phone number or other destination identifier used to identify and locate a device. For example, a service provider may offer customers a communication service 108 configured to manage communication connections and related data (e.g., voice, video, text, and/or image data) sent and received over one or more networks 102 (e.g., a public switched telephone network (PSTN), integrated services digital network (ISDN), Voice over Internet Protocol (VoIP) network, cellular network, private branch exchange (PBX) 124 network, private telephony network, or analog channel). For example, a customer may use a communications application 122 hosted on a client device 120, or a telephone handset 132 connected to a PBX 124, to make and receive calls managed by the communication service 108.

A server 106*a* in the service provider environment 104 may host the communication service 108. As part of managing voice connections, the communication service 108 may be configured to determine whether to allow a connection request based on a trust score for a customer account. In one example, the communication service 108 may receive connection requests from callers associated with a customer account to initiate connections with destination endpoints specified by the callers. A customer account may be associated with a single customer, or a customer account may be linked to a number of caller accounts or sub accounts which are provided access to the communication service 108 through the customer account. In one example, individual trust scores may be generated for caller accounts linked to a customer account.

A caller may initiate a connection request by, for example, entering a destination phone number into a communication device, such as a telephone handset 132 or client device 120 that hosts a communications application 122 configured to route connection requests to the communication service 108.

Also, a connection request may be a call forwarding request that redirects a call from a first destination endpoint to a second destination endpoint. For example, a customer may call a destination endpoint and the call may be redirected to a second destination endpoint where a desired called party may be available, and a trust score for the second destination endpoint may be obtained as described below. In response to receiving a connection request, the communication service 108 may authenticate a customer account associated with the connection request from the caller and evaluate a destination endpoint specified in the connection request.

In one example, as part of processing a connection request to connect to a destination endpoint, the communication service 108 may obtain a trust score for a customer account (or a caller account linked to the customer account) associated with the connection request, and the communication service 108 may evaluate the trust score to determine whether to allow the connection request. In another example, the communication service 108 may determine whether the destination endpoint is categorized as a high risk or high cost destination endpoint, and if the destination endpoint is categorized as high risk or high cost, the communication service 108 may obtain and evaluate a trust score for the customer account (or a caller account linked to the customer account) prior to allowing the connection to the destination endpoint. A trust score may be a value which may be evaluated to determine whether to allow a connection request, and a trust score may be values such as integer, binary, numeric, and/or character values. A destination endpoint may be categorized as a high risk or high cost destination endpoint by referencing a negotiated destination rate table that specifies calling rates for destination endpoints. In another example, a country code, area code, number range, or a destination endpoint itself may be flagged as a high risk or high cost destination endpoint or flagged as being associated with fraudulent activity. In yet another example, a communication network service provider (e.g., a telephone company) may provide a database of destination endpoints and rates.

In the example illustrated in FIG. 1, the communication service 108 obtains a trust score from a scoring agent 110 hosted on a server 106b in the service provider environment 104. The scoring agent 110 may be a service or module configured to generate a trust score for a customer account using cost information associated with connecting to a destination endpoint and information linked to the customer account that impacts a decision whether to allow a voice connection to the destination endpoint. For example, the scoring agent 110 may receive a request for a trust score from the communication service 108 that specifies a customer account and a destination endpoint (e.g., a phone number or other destination endpoint identifier which can be assigned to a destination device 134 or 136). In response to the request, the scoring agent 110 may use the destination endpoint to obtain destination data 112, and the customer account to obtain customer data 116, and call history data 114. Destination data 112 may include a destination rate (e.g., standard rate, premium rate, or international premium rate), a destination endpoint type (e.g., landline, cellular phone, or satellite phone), a destination trust indicator of known or suspected fraudulent activity, and other destination data 112. Customer data 116 may include a customer account status, customer account type, billing account balance, payment history, customer account size, age of customer account, history of fraudulent activity, and other information linked to a customer account. Call history data 114 may include historical data associated with calls linked to a customer account, including patterns of connections to destination endpoints, volume of calls made to destination endpoints, and other data related to calls made to destination endpoints. After obtaining the data 112/114/116, the scoring agent 110 may use the data 112/114/116 to generate a trust score for the customer account, as explained below, and return the trust score to the communication service 108.

In one example, the scoring agent 110 may generate a trust score by applying a rule set 126 to the data 112/114/116. The rule set 126 may be used to evaluate the data 112/114/116 and assign values to trust categories that make up the trust score. For example, a trust score may comprise trust categories that include, for example, a destination risk, a customer status, and a call history. As will be appreciated, additional or different trust categories may be used in a trust score. As part of a request for a trust score, the scoring agent 110 may obtain data 112/114/116 associated with a destination endpoint and a customer account and evaluate the data 112/114/116 using the rule set 126 and assign a value to each trust category. The scoring agent 110 may use the values assigned to the trust categories to generate a trust score for the customer account. For example, the scoring agent 110 may perform a calculation (sum, average, weight, median, etc.) using the values assigned to the trust categories to generate a trust score and return the trust score to the communication service 108. In another example, the scoring agent 110 may return the values of the individual trust categories to the communication service 108, and the communication service 108 may make a determination whether to allow a connection request based on the values of the trust categories, as described later.

As a non-limiting example of using a rule set 126 to generate a trust score, a first rule may assign a risk score to a destination risk category based on factors that may include, a destination rate (e.g., standard rate, premium rate, international premium rate, toll-free rate, etc.), destination endpoint type (e.g., landline, cellular phone, satellite phone, or special services), and/or destination trust indicator of known or suspected fraudulent activity. The risk score may be a value (e.g., integer, binary, floating point, classification, etc.) that indicates a level of risk associated with connecting to a destination, such as a risk of fraud, high cost, or malicious activity. If the risk score exceeds a threshold used to represent a high level risk of excessive fees, fraud, and/or malicious activity associated with connecting to a destination endpoint, then the destination endpoint may be identified as a high risk destination endpoint. A second rule may assign a value to a customer status category based on factors, such as, a customer account type (e.g., business account or individual account), account status (e.g., new account, existing account, trusted business, etc.), prepaid account balance, call volume, age of account, and/or fraudulent activity history. A third rule may assign a value to a call history category based on factors, such as, a customer call history to the destination phone number, call patterns to premium or high rate numbers, and/or call patterns to suspected or known fraudulent destination numbers. After assigning values to the destination risk, customer status, and call history categories, the scoring agent 110 may combine the values to generate a trust score for the customer account associated with the connection request to the destination endpoint. As will be appreciated, a reference to a rule described above may be a reference to a single rule or to multiple rules which may be used to evaluate factors associated with calling a destination endpoint and generating a trust score.

As a specific example of using a rule set 126 to assign values that comprise a trust score, the rule set 126 may assign a value from one (1) to ten (10) to each category based on evaluation of the data 112/114/116. A value of one (1) may represent a low risk of allowing a connection to a destination endpoint, and a value of ten (10) may represent a high risk of allowing a connection to a destination endpoint. Accordingly, a first rule may assign a risk score of 10 to a destination risk category based on a destination endpoint having a high rate and being located in a country associated with fraudulent call activity. A second rule may assign a value of ten (10) to a customer status category based on the customer account being a new account and having a prepaid account balance of zero. A third rule may assign a value of five (5) to a call history category based on the customer account not having a call history. The values assigned to the categories may be compiled to generate a trust score of twenty-five (25). The scoring agent 110 may return the trust score to the communication service 108, and based on the value of the trust score exceeding a threshold value of twenty (20), the communication service 108 may deny the connection request by the customer account to connect to the destination endpoint.

In another example, the scoring agent 110 may generate a trust score based in part on a pattern of historical voice connections to high risk or high cost destination endpoints associated with a customer account. The pattern of historical voice connections (or call pattern 128) may indicate customer behavior for calling high risk or high cost destination endpoints, and the pattern can be used in a decision whether to allow a connection request to a high risk or high cost destination endpoint. For example, in the event that a connection request to a high risk or high cost destination endpoint corresponds to a pattern of voice connections to the high risk or high cost destination endpoint, or similar high risk or high cost destination endpoints, then the scoring agent 110 may generate a trust score that allows the connection request. However, if the connection request deviates from the pattern of voice connections, the scoring agent 110 may generate a trust score that denies the connection request.

The scoring agent 110, in response to a request for a trust score, may obtain call history data 114 associated with a customer account specified in the request. The scoring agent 110 may analyze the call history data 114 to identify a pattern of voice connections to destination endpoints categorized as high risk or high cost destination endpoints. In one example, the pattern of voice connections may be analyzed to determine the existence of a pattern of voice connections to a specific destination endpoint (e.g., high cost destination endpoint) specified in a connection request and the scoring agent 110 may generate a trust score based on a correlation or match of the connection request to the pattern of voice connections to the destination endpoint. As a specific example, the scoring agent 110 may determine that a caller has an established pattern of connection requests to a high risk or high cost destination endpoint specified in a connection request (e.g., five or more connection requests to code +881 (Global Mobile Satellite System) in the past six months) and generate a trust score that allows the connection request (e.g., a binary value that allows the connection request). In another example, the scoring agent 110 may determine whether a pattern of voice connections to a category of destination endpoints exists (e.g., whether there is a history of calling high cost destination endpoints) and calculate a trust score based on a correlation of the connection request to the pattern of voice connections to the destination endpoints. As a specific example, the scoring agent 110 may determine that a customer account has an established pattern of calling various high risk destination endpoints, and based on this pattern, connection requests associated with the customer account to high risk destination endpoints may be generally allowed based on the established pattern. Thus, in the event that a connection request associated with the customer account is not a first time connection request to a high risk destination endpoint, the scoring agent 110 may generate a trust score that allows the connection request based on the established pattern of calling high risk destination endpoints. In yet another example, the scoring agent 110 may use patterns of voice connections associated with other customer accounts (e.g., customer accounts which are trusted based on calling histories and/or absence of fraudulent activity) to generate a trust score based on a correlation or match of the connection request to the patterns of voice connections. For example, the scoring agent 110 may determine that other customer accounts have established patterns of connecting to a destination endpoint, and based on the pattern, the scoring agent 110 may generate a trust score that indicates that a connection request to the destination endpoint is allowable.

In yet another example, the scoring agent 110 may use machine learning to generate a trust score for a customer account. For example, a machine learning model 130 may be trained to generate trust score classifications that indicate allowance or denial of connection requests using training data obtained from call history data 114, destination data 112, and/or customer data 116. In one example, a machine learning model 130 may be trained using data 112/114/116 linked to a specific customer account to generate trust scores for connection requests associated with the customer account. For example, a feature vector may be constructed using destination data 112, customer data 116, call history data 114, and/or other data linked to the customer account, and the feature vector may be submitted to the machine learning model 130 to generate trust score classifications (allowed or denied) for connection requests associated with the customer account. In another example, data 112/114/116 associated with a plurality of customer accounts may be used to train a machine learning model 130 to generate trust score classifications and the machine learning model 130 may be used by the scoring agent 110 to generate trust scores for connection requests received by the communication service 108. For example, a training dataset may be obtained from destination data 112, customer data 116, call history data 114, and/or other data linked to a plurality of customer accounts, and the machine learning model 130 may be trained using the training dataset. In one example, as described later in association with FIGS. 6 and 7, a customer may override a trust score that would otherwise not allow a connection request, and information associated with overriding the trust score can be used in a feedback loop provided to a machine learning model 130 and used to generate trust score classifications. For example, where a customer frequently overrides a trust score to connect to a destination endpoint, the customer overrides may be provided to the machine learning model 130 in the feedback loop, and the machine learning model may use the customer overrides as one factor in generating a trust score classification for a connection request.

The machine learning model 130 may then be deployed to a production environment (e.g., server 106b) to be used by the scoring agent 110 to generate trust score classifications for connection requests received by the communication service 108. Any supervised or unsupervised machine learning classifier may be used to build the machine learning model 130, including linear classifiers (e.g., logistic regression, naive Bayes classifier, etc.), support vector machines, decision trees (e.g., random forests), neural networks, and the like.

After training a machine learning model 130 to generate trust score classifications, the machine learning model may be deployed to the server 106*b* for use by the scoring agent 110. The scoring agent 110 may handle a request for a trust score received from the communication service 108 by obtaining destination endpoint features and/or customer features associated with a destination endpoint and customer account specified in the request and inputting the features to the machine learning model 130. Illustratively, destination endpoint features may include a destination phone number, country code, area code, call rate, and other destination endpoint information. Customer features may include a customer account status, billing account balance, customer-service provider relationship status, business type, fraudulent activity history, destination endpoint call history, and other customer information.

The machine learning model 130 may also be used to predict whether a risk of fraud associated with the connection request is low or high, and the machine learning model 130 may output a trust score classification that corresponds to the predicted risk. The scoring agent 110 may return the trust score classification output by the machine learning model 130 to the communication service 108, and the communication service may use the trust score classification to allow or deny a connection request associated with the customer account.

Figure 2:
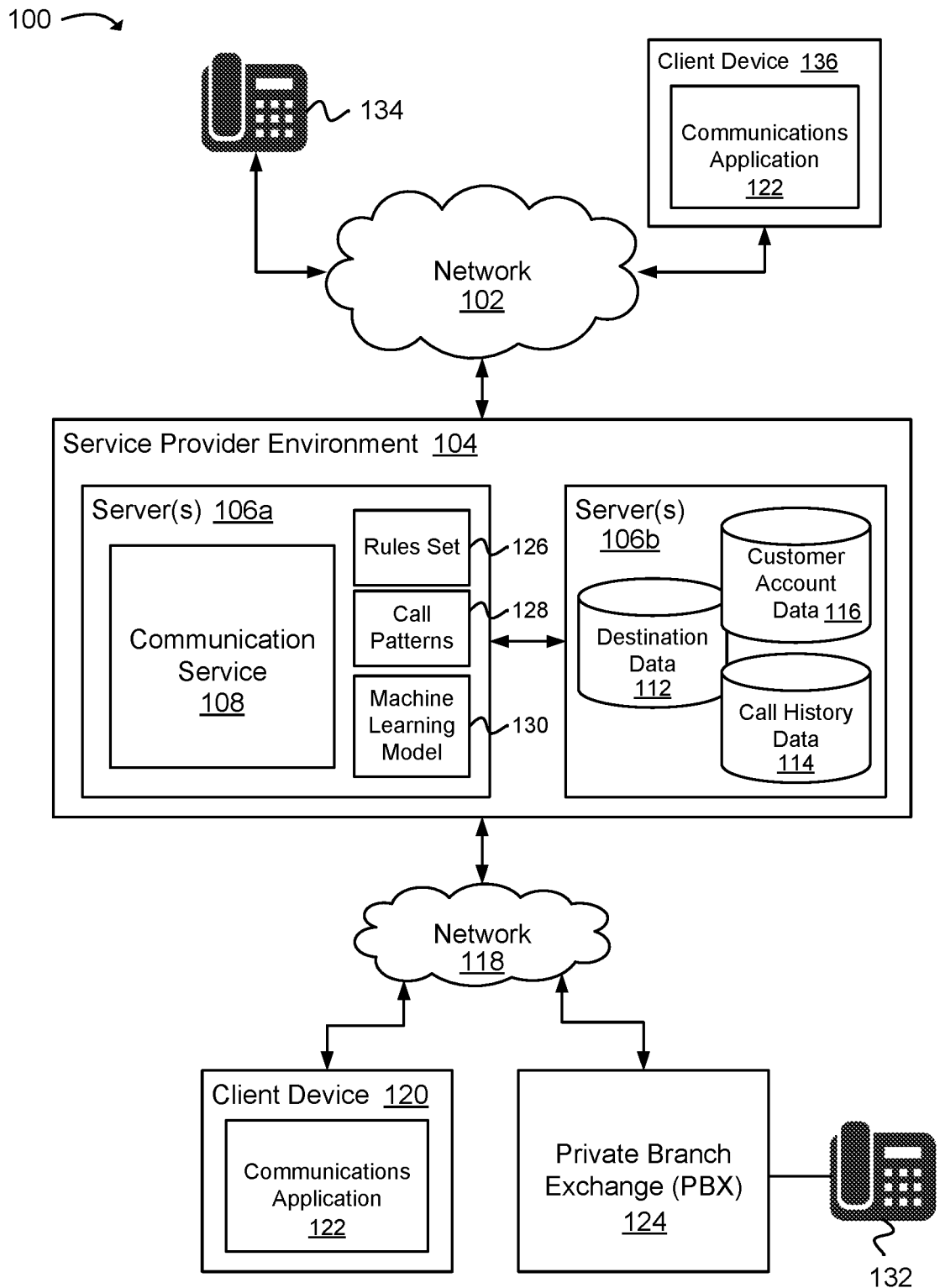

In the example described above and illustrated in FIG. 1, the scoring agent 110 generates a trust score used to determine whether to allow a connection request associated with a customer account. In another example, as illustrated in FIG. 2, the communication service 108 may be configured to generate a trust score in response to receiving a connection request. For example, the communication service 108 may be configured to generate a trust score using a rule set 126, call pattern 128, and/or machine learning model 130 as described above with respect to the scoring agent 110. As an illustration, the communication service 108 may receive a connection request from a caller, generate a trust score using any of the techniques described above, and make a determination whether to allow the connection request based on the trust score.

Returning to FIG. 1, the communication service 108 may request a trust score from the scoring agent 110 and evaluate the trust score returned by the scoring agent 110 to determine whether to allow a connection request associated with a customer account. A trust score may comprise any type of indicator or set of indicators used to represent a risk of allowing a caller to connect to a destination endpoint. For example, a trust score may be a binary value, classification value (e.g., Yes or No or weighted values), numeric value, or a set of values that can be evaluated by the communication service 108 to determine whether to allow or deny a connection request. The communication service 108 may evaluate the value of the trust score and either allow or deny a connection request based on the evaluation. As an example, the scoring agent 110 may return a trust score classification indicating that a connection request should be allowed, and the communication service 108 may allow the connection request to be executed. As another example, the scoring agent 110 may return a numeric value, and the communication service 108 may evaluate the trust score and determine that the numeric value meets a threshold that allows the connection request to be executed. In yet another example, the scoring agent 110 may return separate trust score values for a number of trust categories (e.g., destination risk, customer status, call history, and other categories) to the communication service 108, and the communication service 108 may evaluate the trust score values and determine whether the trust score values meet a threshold that allows the connection request to be executed. For example, in the event that a majority of categories have assigned trust score values that allow the connection request, the communication service 108 may allow the connection request. In some examples, the separate trust score values returned by the scoring agent 110 may be weighted according to a weight assigned to a trust category.

As part of a determination by the communication service 108 that a trust score allows a connection request to be executed, the communication service 108 may complete the connection request by establishing a connection between an origin endpoint (e.g., an originating device such as 120 and 132) and a destination endpoint assigned a phone number or other type of identifier. The connection may be over any type and combination of networks capable of transmitting communication data (e.g., voice, video, text, and image) between the origin endpoint and destination endpoint, including a public switched telephone network (PSTN), packet switched network (PSN) (e.g., including the Internet), Voice over Internet Protocol (VoIP) network, cellular network, private branch exchange (PBX) network, and the like. The communication service 108 may manage data packets transmitted by the origin endpoint and the destination endpoint over the networks 102 and 118. Also, the communication service 108 may collect call history data 114 associated with connections managed by the communication service 108, which may be used as described above.

In determining that a trust score does not allow a connection request to be executed, the communication service 108 may deny the connection request. In one example, the communication service 108 may provide a caller with an indication that the connection request has been denied. For example, the communication service 108 may generate a message (e.g., a voice message, text message, graphical pop-up window with a message or graphic in an application) or generate a tone (e.g., number unobtainable tone) that indicates to a caller that the connection request has been denied. In some examples, the message may include a reason why the connection request was denied (e.g., insufficient account balance, suspected fraudulent phone number, inactive customer account, etc.).

In one example, the communication service 108 may be configured to allow a caller, individual, or customer (e.g., a corporate supervisor) to override a denial of the caller's request to initiate a connection with a destination endpoint by providing an instruction to the communication service 108 to override the denial and initiate a connection with the destination endpoint. For example, a caller may be aware that a destination endpoint is a high risk destination endpoint associated with a premium calling rate, yet the caller may still want to call the destination endpoint. Therefore, the caller may override a denial of the caller's connection request by instructing the communication service 108 to disregard a trust score and initiate the connection request.

Allowing a caller to override connection request denials may result in building a customer pattern of calls to high risk destination endpoints, such that sometime in the future the pattern of calls may be used to calculate trust scores for the caller's connection requests to high risk destination endpoints that will allow the connection requests. In one example, as described later in relation to FIG. 6, the communication service 108 may advise a caller, via a voice or text message, that the caller can override a denial of the caller's connection request by providing an override indication (e.g., submitting a number, code, selecting a user interface control, etc.), and after receiving the override indication, the communication service 108 may allow the connection request and initiate a connection with the destination endpoint. In another example, as described later in relation to FIG. 7, in response to receiving an instruction to override a denial of a connection request, the communication service 108 may be configured to prompt a caller for an authorization code that overrides a denial of the caller's request. The communication service 108 may validate the authorization code, and if valid, the communication service 108 may initiate the connection with the destination endpoint.

A caller may utilize a device 120/132 to initiate a connection request with a destination endpoint assigned a destination number, as well as send communications to, and receive communications from, a destination endpoint. A device 120/132 may include devices capable of sending and receiving communication data over a network 102/118. A client device 120 may include a processor-based system, such as a computing device that hosts a communications application 122 that has functionality for voice calling, video calling, messaging, faxing, and the like. For example, the communications application 122 may include a telecommunications application that utilizes an Internet telephony network and other networks to transmit calls. A caller may use the communications application 122 to initiate calls to destination devices 134/136 and receive calls from destination devices 134/136.

A client device 120 may be a device such as, but not limited to, a desktop computer, workstation, laptop or notebook computer, tablet computer, handheld computer, smartphone, or other devices with like capability. A device 132 may be a telephone device, such as a telephone headset connected to a PBX phone system. A PBX phone system may be a private telephone network used within a company or organization configured to route calls to the communication service 108. Users of the PBX phone system can communicate internally (within the company) and externally with external phone systems via the communication service 108 using various communication channels like VoIP, integrated services digital network (ISDN), or analog channels.

The various processes and/or other functionality contained within the service provider environment 104 may be executed on one or more processors that are in communication with one or more memory modules. The service provider environment 104 may include a number of computing devices that are arranged, for example, in one or more server banks or computer banks or other arrangements. The computing devices may support a computing environment using hypervisors, virtual machine monitors (VMMs) and other virtualization software. The service provider environment 104, in some examples, may include computing resources for executing computing instances (e.g., virtual machines), which may be an instance of a software implementation of a machine (i.e. a computer) configured to emulate a physical machine, as described in more detail later in association with FIG. 8. One or more computing instances may be used to execute the communication service 108 and the scoring agent 110. Moreover, the communication service 108 and the scoring agent 110 may be scaled (e.g., duplicated and attached to a load balancer) based in part on demand for the communication and scoring agent services 108/110 by launching and terminating computing instances used to execute the communication and scoring agent services 108/110.

Server(s) 106c may include data stores containing destination data 112, call history data 114, customer data 116, and other data. The data stores may be accessible to the communication service 108 and the scoring agent 110, which may utilize the data 112/114/116 as described earlier. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to modules and services (e.g., the scoring agent) included in the service provider environment 104 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 102 may include any communication network capable of transmitting communication data, including, but not limited to, a PSTN, ISDN, analog network, cellular network, and the Internet. The network 118 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIGS. 1 and 2 illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIGS. 1 and 2 illustrate examples of system environments that may implement the techniques above, many other similar or different environments are possible. The example environments discussed and illustrated above are merely representative and not limiting.

Figure 3:
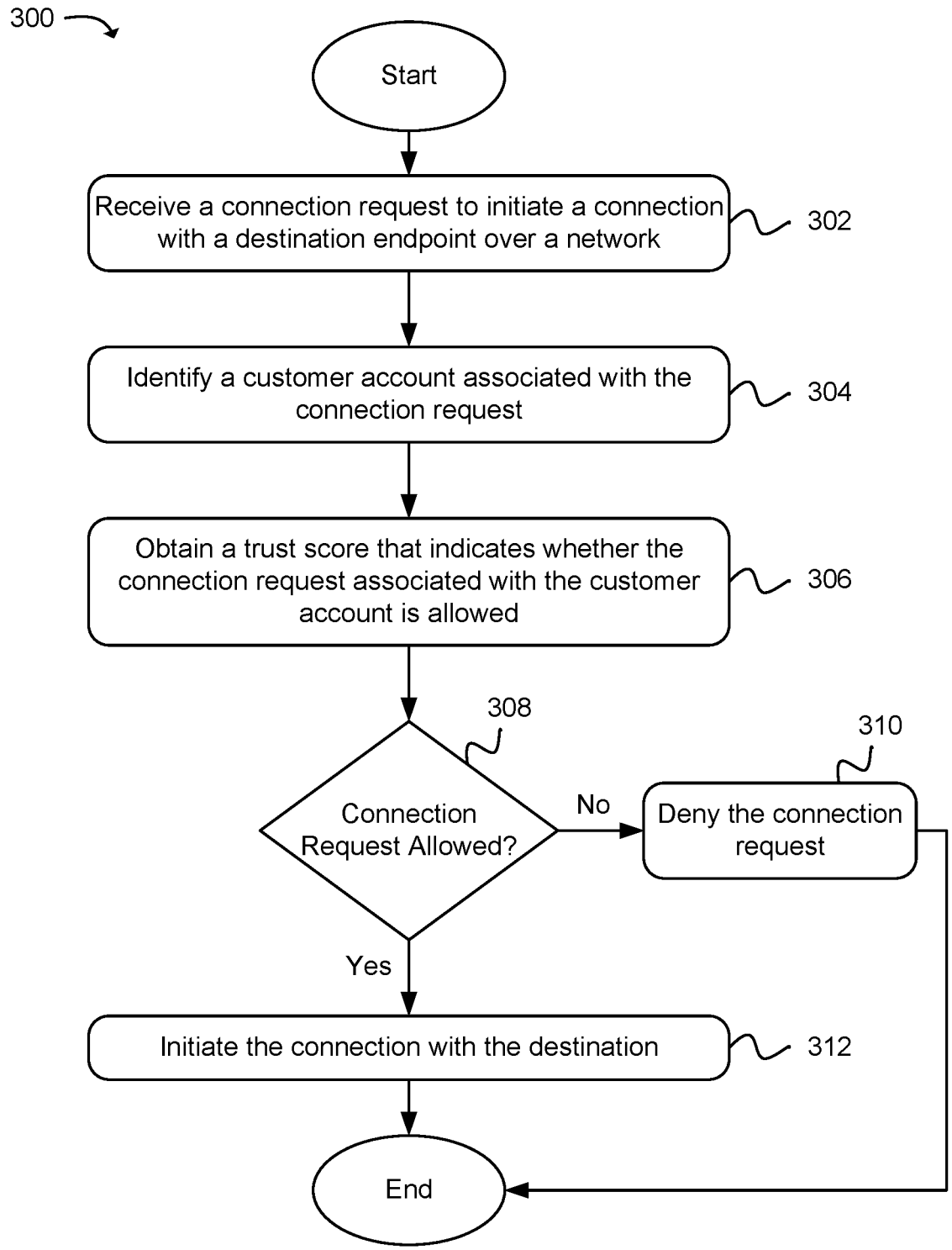
FIG. 3 is a flow diagram that illustrates an example method for processing a connection request associated with a customer account to initiate a connection with a destination endpoint over a network.

FIG. 3 is a flow diagram illustrating an example method 300 for processing a connection request associated with a customer account to initiate a connection with a destination endpoint over a network. As described earlier, a trust score for a customer account may be generated in response to receiving a connection request at a communication service to connect to a destination endpoint, and the trust score may be evaluated to determine whether to allow the connection request.

As in block 302, a connection request may be received from an origin endpoint (e.g., a telephone device or a communications application) to initiate a connection with a destination endpoint, such as a voice connection, video connection, messaging connection, and the like may be received by a communication service provided by a service provider. As an example, a customer of the service provider may use a communications application hosted on a customer's device or originating device (e.g., computer, smartphone, etc.) to call a destination endpoint. The communications application may be configured to facilitate telephone calls, video conferencing, direct messaging, and other communications. The customer may enter a phone number into a user interface of the communications application, and the communications application may send a connection request to the communication service hosted in a service provider environment. The connection request may include the destination phone number entered by a caller and a user identifier that links the caller to a customer account. In some examples, a user identifier may be linked to a level of trust assigned to a customer, and the level of trust may indicate whether to obtain a trust score for a connection request associated with the user identifier. As a non-limiting example, a high level of trust may be assigned to certain executives in a corporation that allows connection requests to destination endpoints without having to obtain a trust score.

In response to receiving the connection request, the communication service may identify a customer account associated with the connection request, as in block 304, and obtain a trust score that indicates whether the connection request associated with the customer account is allowed, as in block 306. For example, the communication service may be configured to use a customer identifier, such as a username, account number, internet protocol (IP) address, etc. included in the connection request to identify a customer account. The communication service may then obtain a trust score for the customer account that indicates whether the customer account is allowed to connect to the destination endpoint indicated in the connection request. In one example, the communication service may request a trust score from a scoring agent configured to generate a trust score for a customer account. In another example, the communication service may be configured to generate the trust score.

In one example, the trust score may be determined based in part on (i) a risk score associated with connecting to a destination endpoint over a network, and (ii) customer information linked to the customer account that impacts a decision to allow the connection request. A risk score associated with connecting to a destination endpoint may include a risk of connecting to a high cost destination endpoint or a standard rate destination endpoint which may charge a higher cost relative to other destination endpoints (e.g., on a rate sheet or in a defined geographic area), and a risk of malicious or fraudulent activity, such as repeatedly calling a number over a short period of time, calls to unrecognized destination endpoints, calls made outside of normal business hours, calls to numbers for long periods of time, as well as other calls that appear to be suspicious or uncharacteristic of a particular customer. Calculating a risk score, in one example, may include evaluating various risks or risk categories (e.g., cost, fraud, maliciousness, etc.) associated with connecting to a destination endpoint and determining a value (integer, binary, classification, etc.) of the risk score that represents the risk of connecting to the destination endpoint. Customer information linked to a customer account may include, but is not limited to: customer account status, business type, billing account balance, customer fraudulent activity history, customer call history, destination call volume history, and other information linked to the customer account. When evaluated, the customer information may provide factors that indicate whether a customer may be allowed to call a destination endpoint. For example, a customer account status that indicates a size, duration, and nature of a relationship with a service provider may be used as one factor in generating a trust score. For instance, a customer account status that indicates that a customer has an established business account for a well-known business or for a certain period of time may indicate that the customer can be trusted to make a call to a destination endpoint. Other factors that indicate that a customer can be trusted to make a call to a destination endpoint may include a billing account balance that is sufficiently funded, a lack of history of customer fraudulent activity, and/or a history of calling high risk/cost destination endpoints.

As described earlier in relation to FIG. 1, different techniques may be used to generate a trust score. One example of generating a trust score includes applying a rule set to destination risk information, customer status information, and call history information. For example, a first rule may be used to evaluate destination risk information to determine a risk score that represents whether a destination endpoint is a high cost destination endpoint and/or whether the destination endpoint is associated with fraudulent activity. A second rule may be used to evaluate customer status information for a customer account to determine a monetary risk associated with allowing a connection request for the customer account to connect to a destination endpoint. A third rule may be used to evaluate call history information linked to the customer account to determine whether the customer account has a history of calling the destination endpoint, or similar destination endpoints. The trust score may be generated based on the results of the evaluations performed using the rule set. As a specific example, application of the rule set may determine that the destination endpoint is a high risk destination endpoint, the customer account is trusted to connect to high risk destination endpoints, and the customer has a history of connecting to high risk destination endpoints, and based on these results, a trust score may be generated to indicate that a connection request for the customer account may be allowed.

Another example of generating a trust score, as described earlier, may include matching a connection request to a pattern of customer connections to high risk/cost destination endpoints or other destination endpoints that may be associated with suspected fraudulent activity. For example, a customer call history linked to a customer account may be analyzed for a pattern of connections to destination endpoints categorized as high risk destination endpoints, and a trust score may be generated based in part on matching the connection request to the pattern of connections to the high risk destination endpoints. As a specific example, analysis of a customer call history may show that a customer account has an established pattern of calling high risk destination endpoints at the end of each fiscal quarter, and based on this pattern, connection requests associated with the customer account to high risk destination endpoints at the end of a fiscal quarter may be allowed based on the established pattern.

As another example of generating a trust score explained earlier in relation to FIG. 1, a machine learning model may be trained to generate a trust score that is a classification using training data associated with historical voice connections linked to customer accounts. After training the machine learning model, destination endpoint features and customer account features may be input to the machine learning model, and the machine learning model may output a trust score which is a classification for a customer account that indicates whether to allow a connection request. For example, in response to a connection request from a caller, destination endpoint features (e.g., destination phone number, country code, area code, and/or call rate) and customer features (e.g., customer account status, billing account balance, customer-service provider relationship status, business type, fraudulent activity history, and/or destination call history) may be retrieved from various data stores and the features may be input to the machine learning model, which may evaluate the features and output a trust score or classification that indicates whether to allow the connection request.

As in block 308, the communication service may evaluate the trust score for the customer account to determine whether the connection request to the destination endpoint is allowed based on the value of the trust score. In the case that the customer account is allowed to connect to the destination endpoint based on the trust score, then as in block 312, the communication service may initiate the connection by routing communication data to the destination endpoint (e.g., telephone handset, mobile device, computer, etc.) over one or more networks, which may include a PSTN network. In the case that the trust score does not allow the customer account to connect to the destination endpoint, then as in block 310, the connection request may be denied, and the connection request may be processed as explained in relation to FIGS. 6 and 7.

Figure 4:
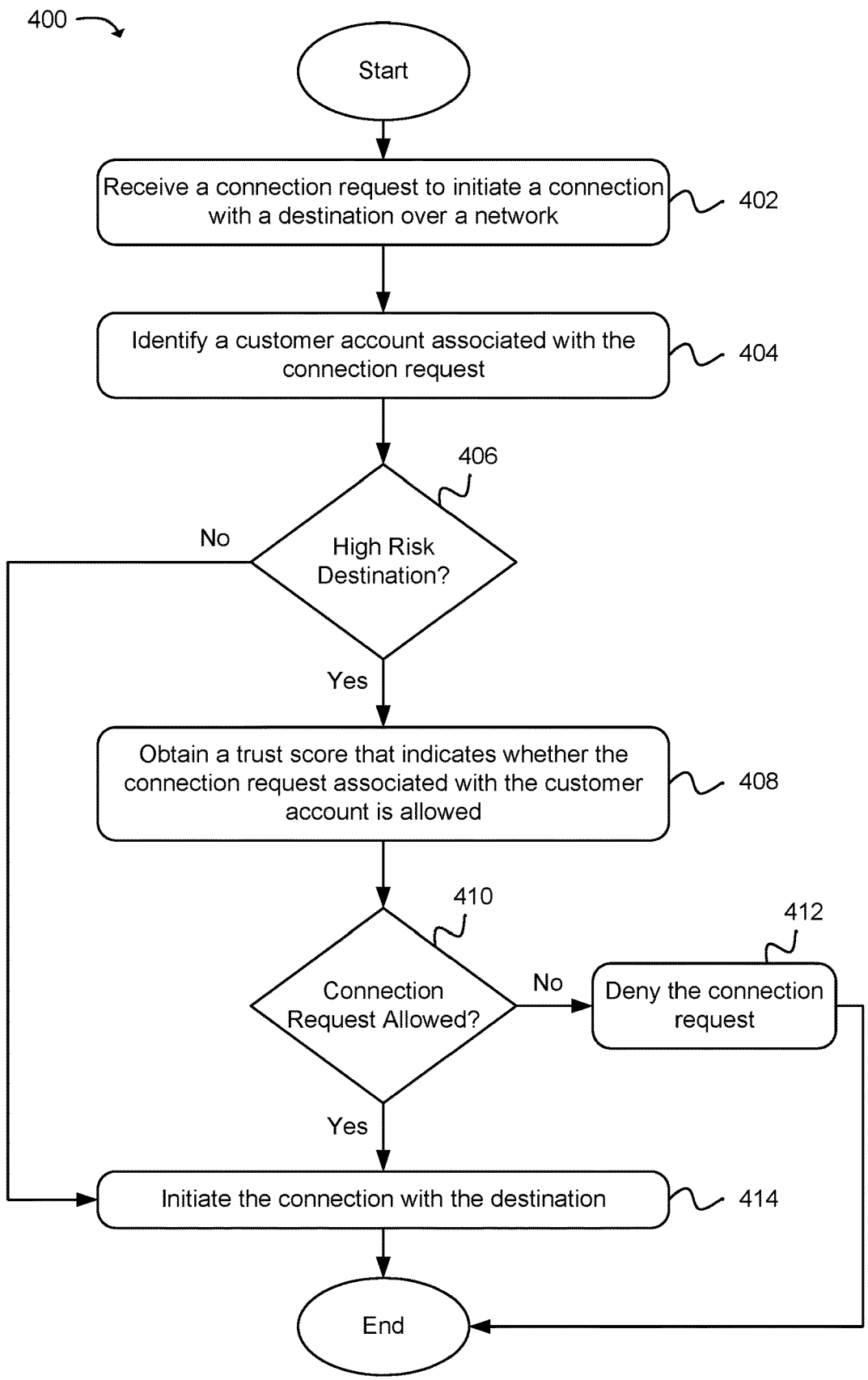
FIG. 4 is a flow diagram illustrating an example method for processing a connection request associated with a customer account to connect to a destination endpoint identified as a high risk destination endpoint over a network.

FIG. 4 is a flow diagram that illustrates an example method 400 for processing a connection request associated with a customer account to connect to a destination endpoint identified as a high risk destination endpoint over a network. A high risk destination endpoint may be a destination endpoint associated with a high cost and/or a high risk of fraud/malicious activity. As in block 402, the communication service described previously may receive a request from an origin endpoint associated with a customer account to initiate a connection with a destination endpoint over a network. In response to the connection request, the communication service may identify a customer account associated with the connection request, as in block 404, and make a determination whether the destination endpoint is categorized as a high risk destination endpoint, as in block 406. That is, prior to generating a trust score, the method 400 first determines whether a destination endpoint is a high risk destination endpoint, and then generates a trust score if the destination endpoint is a high risk destination endpoint. For example, the method 400 may calculate a risk score for a destination endpoint based on factors that include a cost associated with connecting to the destination endpoint and a risk of fraud and/or malicious activity associated with connecting to the destination endpoint. A cost related to calling a destination endpoint may be determined by referencing a negotiated destination rate table that specifies calling rates for destination endpoints. In another example, a country code, area code, number range, or the destination endpoint itself may be flagged as a high risk destination endpoint or flagged as being associated with fraudulent activity. In yet another example, a communication network service provider (e.g., a telephone company) may provide a database of destination endpoints and rates which may be accessible to the communication service. The risk score can be calculated as described earlier in relation to FIG. 1. If the risk score exceeds a threshold, then the destination endpoint can be identified as a high risk destination endpoint.

In the case that the destination endpoint is not identified as a high risk destination endpoint, then the communication service may allow the connection request and initiate the connection with the destination endpoint, as in block 414. However, in the case that the destination endpoint is identified as a high risk destination endpoint, then as in block 408, a trust score that indicates whether the connection request associated with the customer account is allowed may be obtained, as described earlier. As in block 410, if the trust score for the customer account indicates that the connection request should be allowed, then as in block 414, the communication service may initiate the connection with the destination endpoint. If the trust score indicates that the connection request should not be allowed, then the connection request may be denied, as in block 412.

Figure 5:
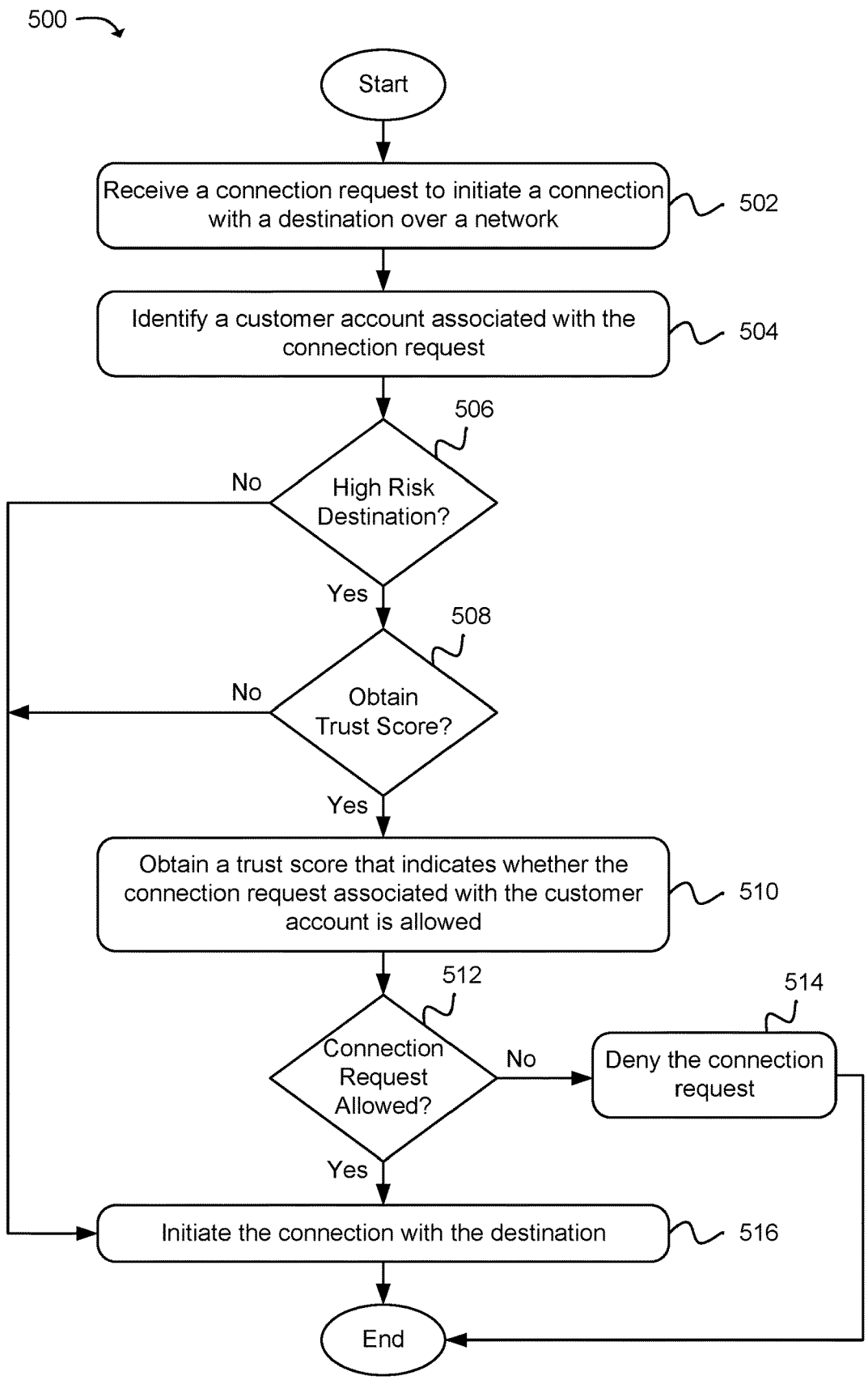
FIG. 5 is a flow diagram that illustrates an example method for identifying a setting linked to a customer account that a trust score be evaluated prior to allowing a connection to a destination endpoint.

FIG. 5 is a flow diagram illustrating an example method 500 for identifying a condition linked to a customer account that a trust score is to be evaluated prior to allowing a connection to a destination endpoint. For example, a service provider may allow established customer accounts to connect to high risk destination endpoints, and impose a condition linked to new customer accounts that a trust score is to be evaluated before allowing a connection to a high risk destination endpoint.

As in block 502, a connection request received from an origin endpoint associated with a customer account to initiate a connection with a destination endpoint over a network may be received at the communication service described in relation to FIG. 1. In response to receiving the connection request, the communication service may identify a customer account associated with the connection request, as in block 504, and make a determination whether the destination endpoint is categorized as a high risk destination endpoint, as in block 506. For example, a risk score can be calculated for the destination endpoint, and if the risk score exceeds a threshold, then the destination endpoint can be identified as a high risk destination endpoint. In the event that the destination endpoint is identified as a high risk destination endpoint, then the communication service may determine whether the customer account is linked to a condition that a trust score for the customer account be evaluated prior to allowing the connection to the high risk destination endpoint, as in block 508. If the customer account is not linked to the condition that a trust score be evaluated, then as in block 516, the communication service may initiate the connection with the destination endpoint. However, if the customer account is linked to the condition, then as in block 510, the communication service may obtain a trust score indicating whether the connection request should be allowed, as described earlier.

As in block 512, the communication service may determine whether the trust score for the customer account indicates that the connection request should be allowed, and if so, then as in block 516, the communication service may initiate the connection with the destination endpoint. However, if the trust score indicates that the connection request should not be allowed, then the communication service may deny the connection request, as in block 514.

Figure 6:
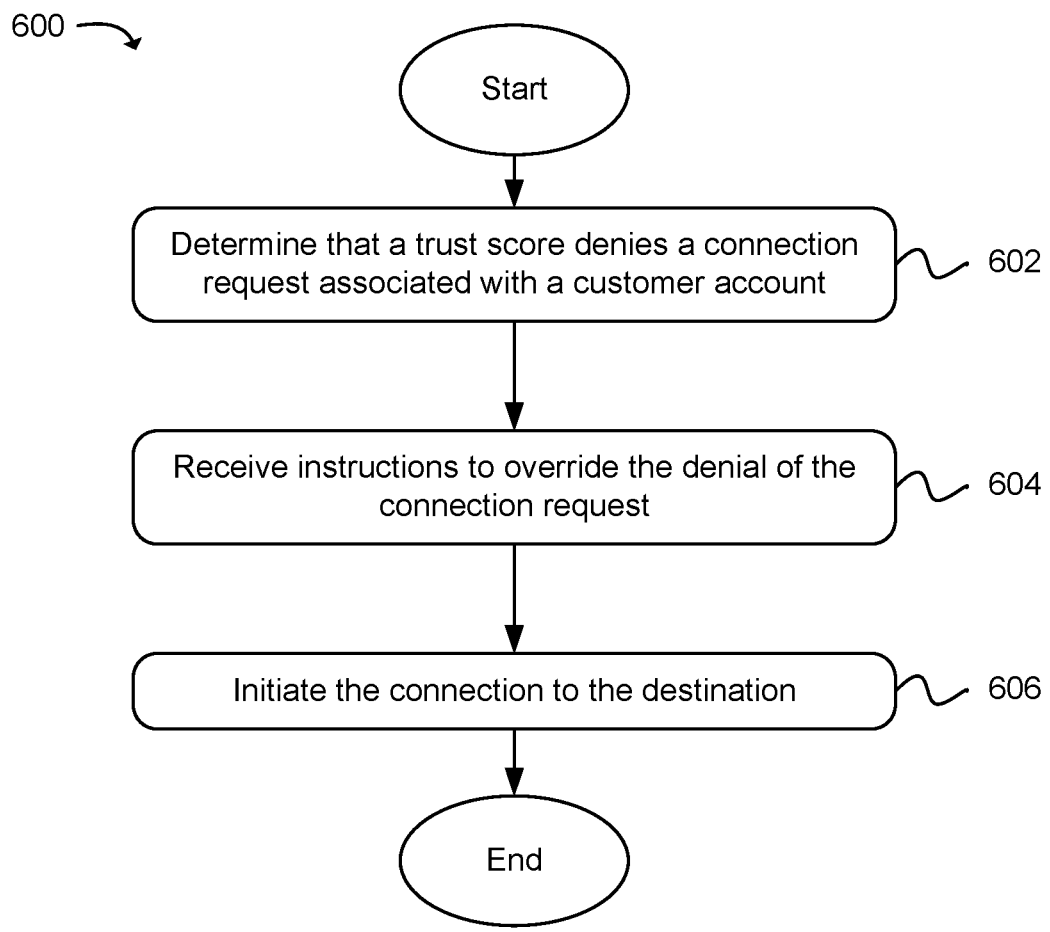
FIG. 6 is a flow diagram illustrating an example method for overriding a denial of a connection request.

FIG. 6 is a flow diagram that illustrates an example method 600 for overriding a denial of a connection request. In one example, as part of denying a connection request based on a trust score for a customer account, the communication service described in relation to FIG. 1 may advise a caller via a message that the caller may override the denial of a connection request and instruct the communication service to execute the connection request, as described below.

As in block 602, the communication service may determine that a trust score for a customer account denies a connection request to connect to a destination endpoint. The communication service, in one example, may notify a caller that the connection request has been denied and advise the caller that the denial of the connection request may be overridden, and provide the caller with instructions to override the denial of the connection request. Thereafter, if the caller wants to continue with the connection request, the caller may follow the instructions that override the denial of the connection request. As an example, the communication service may instruct the caller to press a number or character on a telephone interface, or say a word or phrase into a speaker of a phone device.

As in block 604, the communication service may receive instructions to override the denial of the connection request, and as in block 606, the communication service may initiate the connection to the destination endpoint. For example, the communication service may receive a number or character entered into a telephone interface, or voice data for a word or phrase spoken into a speaker of a phone device, that overrides the denial of the connection request, and the communication service may initiate a connection with the destination endpoint by routing communication data to a device over one or more networks.

Figure 7:
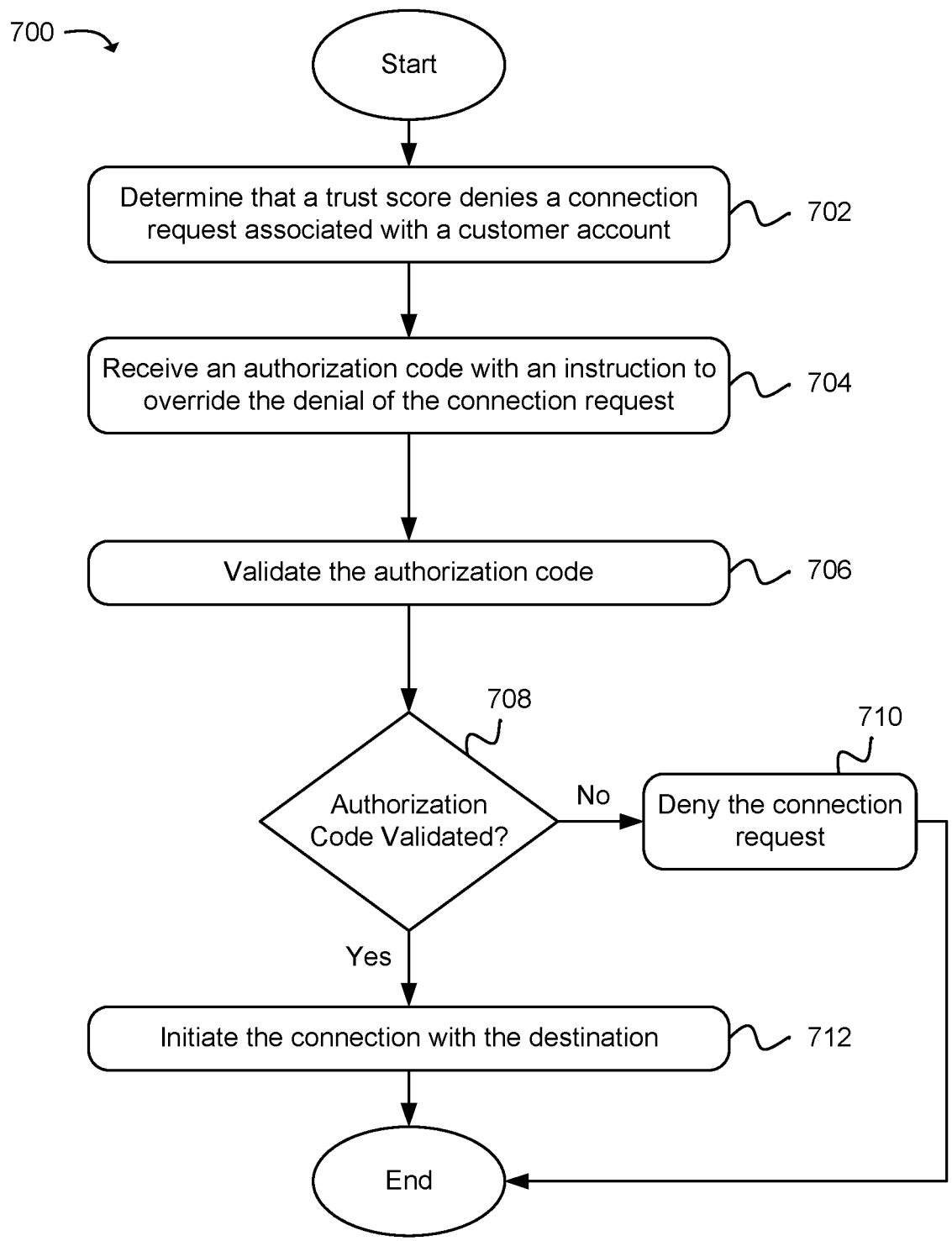
FIG. 7 is a flow diagram that illustrates an example method for overriding a denial of a connection request using an authorization code.

FIG. 7 is a flow diagram that illustrates an example method 700 for overriding a denial of a connection request using an authorization code. For example, a service provider of a communication service may provide a caller with an authorization code which may be used to override a denial of a connection request.

As in block 702, the communication service may determine that a trust score for a customer account denies a connection request to connect to a destination endpoint. As in block 704, the communication service may receive an authorization code with an instruction to override the denial of the connection request. For example, in response to a denial of a connection request, a caller may submit a validation code to the communication service that, when valid, overrides the denial of the connection request. Illustratively, a validation code may include a string of numbers, characters, or any combination thereof that may be submitted to the communication service via an input device such as a keypad or graphical user interface. A validation code may also include a spoken word or phrase submitted to the communication service via a microphone input device. As will be appreciated, other types of validation codes are contemplated as part of this disclosure. As part of receiving a validation code after denying a connection request, the communication service may interpret receiving the validation code as an instruction to override the denial of the connection request.

As in block 706, the communication service may validate the authorization code submitted by the caller, for example, by comparing the submitted authorization code to an authorization code data store or record. As in block 708, in the case that the authorization code is valid, the communication service may initiate the connection with the destination endpoint over one or more networks, as in block 712. However, in the case that the authorization code is not valid, then as in block 710, the communication service may again deny the connection request.

Figure 8:
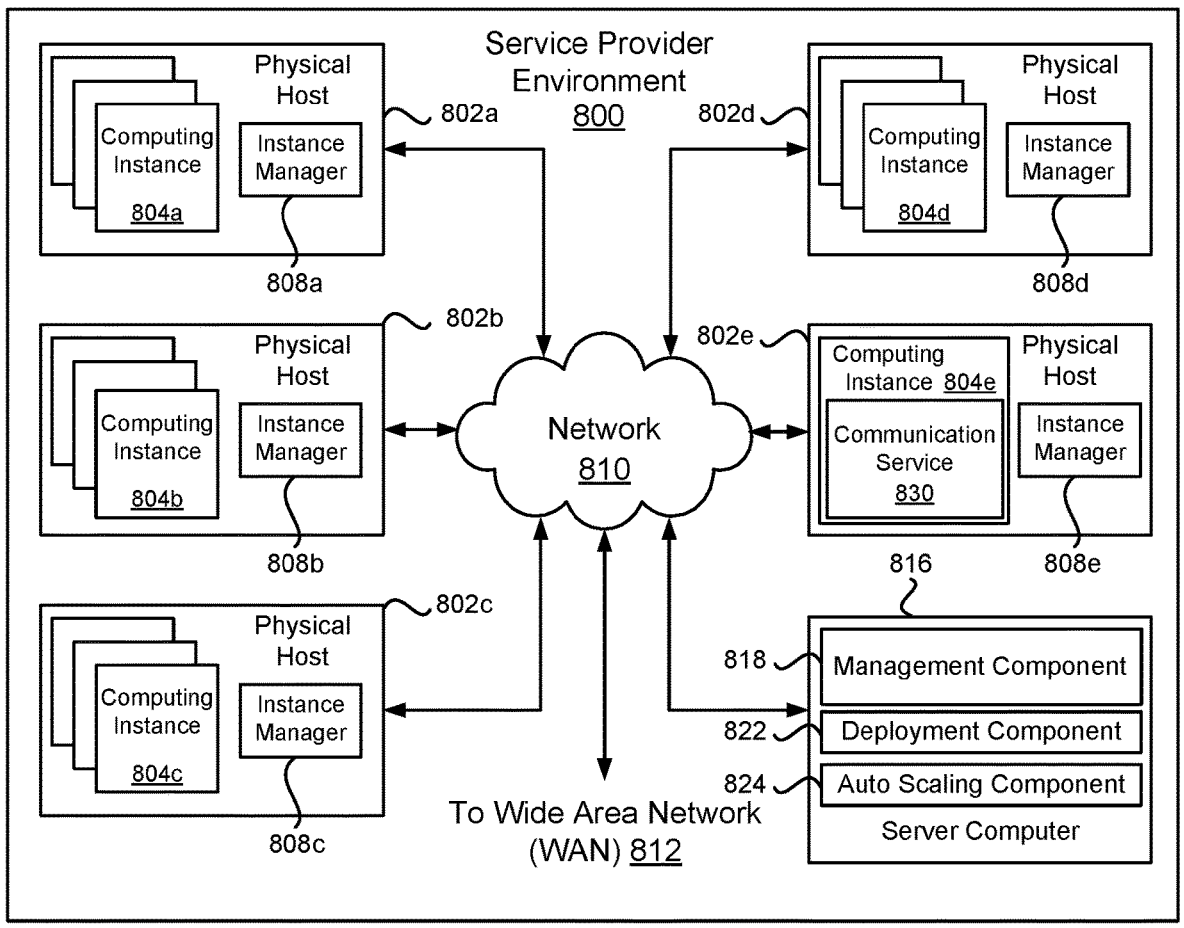
FIG. 8 is a block diagram that illustrates an example service provider environment.

FIG. 8 is a block diagram illustrating a computing system diagram that illustrates one configuration for a service provider environment 800 which may be used to implement the technology described herein. The example service provider environment 800 shown in FIG. 8 may include several physical hosts 802a-e for providing computing resources for hosting applications and services. A physical host 802a-e may be a server computer configured to provide computer resources to host one or more computing instances 804a-e. A computing instance 804a-e may be a virtual machine. As known in the art, a virtual machine is an instance of a software implementation of a machine (i.e., a computer) that executes programs like a physical machine. In the example of computing instances 804a-e, each physical host 802a-e may be configured to execute an instance manager 808a-e capable of executing the computing instances 804a-e. In one example, one or more computing instances 804e may be used to host the communication service 830 described earlier. Instance manager 808a-e may be a hypervisor or another type of program configured to enable the execution of multiple computing instances 804a-e on a single physical host 802a-e, for example.

The service provider environment 800 may be capable of delivery of computing, storage, and networking capacity as a software service. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), network-accessible system as a service, and/or Software as a Service ("SaaS"). Other models may be provided. For the IaaS model, the service provider environment 800 may offer computers as physical or virtual machines and other resources. The virtual machines may be run as guests by a hypervisor, as described further below. The network-accessible system as a service model delivers a computing system that may include an operating system, programming language execution environment, database, and web server.

It should be appreciated that although the embodiments disclosed herein are described primarily in the context of computing instances 804a-e, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing computing instances 804a-e.

The service provider environment 800 shown in FIG. 8 may also include a server computer 816 reserved for executing software components for managing the operation of service provider environment 800, physical hosts 802a-e, and computing instances 804a-e. In particular, server computer 816 may execute a management component 818. An entity may access management component 818 to configure various aspects of the operation of computing instance 804*a-e* purchased by the entity. For example, the entity may purchase computing instance 804*a-e* and make changes to the configuration of the computing instance 804*a-e*. The entity may also specify settings regarding how the purchased computing instances 804*a-e* are to be scaled in response to demand. The entity may also provide requests to launch computing instance 804*a-e* to management component 818.

An auto scaling component 824 may scale computing instance 804*a-e* based upon rules defined by an entity. For example, auto scaling component 824 may allow an entity to specify scale up rules for use in determining when new computing instance 804*a-e* should be instantiated and scale down rules for use in determining when existing computing instance 804*a-e* should be terminated.

The service provider environment 800 may also be configured with a deployment component 822 to assist entities in the deployment of new instances of computer resources. Deployment component 822 may receive a configuration from an entity that includes data describing how new computing instance 804*a-e* should be configured. For example, the configuration may specify one or more applications that should be installed in new computing instance 804*a-e*, provide scripts and/or other types of code to be executed for configuring new computing instance 804*a-e*, provide cache warming logic specifying how an application cache should be prepared, and other types of information.

Deployment component 822 may utilize the entity-provided configuration and cache warming logic to configure, prime, and launch new computing instance 804*a-e*. The configuration, cache warming logic, and other information may be specified by an entity using management component 818 or by providing this information directly to deployment component 822. Other mechanisms may also be utilized to configure the operation of deployment component 822.

In the example service provider environment 800, network 810, such as a local area network (LAN) may be utilized to interconnect physical hosts 808*a-e* and server computer 816. The network 810 may also be connected to WAN 812. It should be appreciated that the network topology illustrated in FIG. 8 has been simplified and that many more networks and networking devices may be utilized to interconnect the various components included in the service provider environment 800. Load balancing devices or software modules may also be utilized for balancing a load between each of the physical hosts 802*a-e* in the service provider environment 800 and between computing instances 804*a-e*. These network topologies and devices should be apparent to those skilled in the art.

It should be appreciated that service provider environment 800 is merely illustrative and that other implementations may be utilized. In particular, functionality described herein as being performed by management component 818, auto scaling component 824, and deployment component 822 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 9:
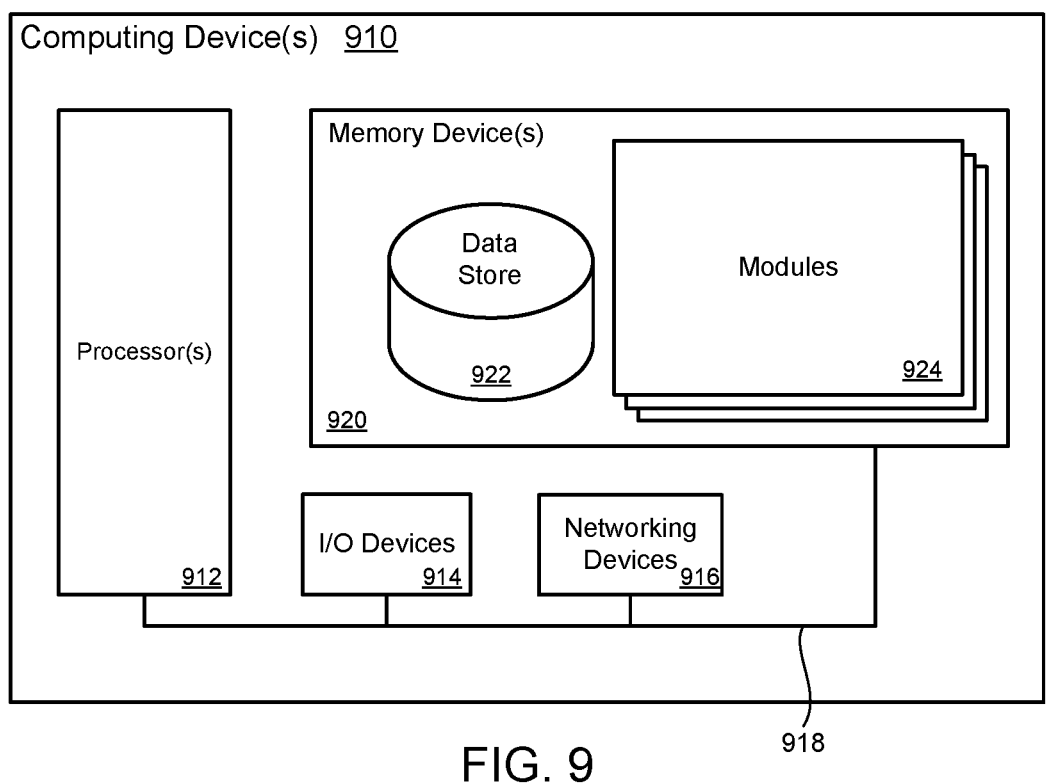
FIG. 9 is block diagram illustrating an example of a computing device that may be used to execute a method for processing a connection request associated with a customer account to initiate a connection with a destination endpoint over a network.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one example, the modules may include a communication service module, a scoring agent module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high-level programming languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the Internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local communication interface 918 may be used as a network to facilitate communication between any of the multiple processors and multiple memories. The local communication interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor; and
   a memory device including instructions that, when executed by the at least one processor, cause the system to:
   receive, at a communication service hosted in a service provider environment, a connection request to initiate a connection between an origin endpoint at a first location and a destination endpoint at a second location over a public switched telephone network (PSTN), the first location being remote from the second location;
   identify a customer account associated with the connection request;
   obtain, based on the connection request, a trust score that indicates whether the connection request associated with the customer account is allowed, wherein the trust score is determined based in part on a risk score associated with the destination endpoint and a pattern of previous voice connections of the customer account with one or more first destination endpoints categorized as a high risk destination endpoint and one or more second destination endpoints categorized as a high cost destination endpoint;
   determine that the connection request associated with the customer account is allowed to initiate the connection with the destination endpoint based in part on the trust score; and
   initiate the connection with the destination endpoint over the PSTN.

2. The system in claim 1, wherein the connection with the destination endpoint is initiated based in part on a lack of deviation of the connection request with respect to the pattern of previous voice connections.

3. The system in claim 1, wherein the connection request is received from a communications application hosted on a client device that transmits and receives communication data for the connection with the destination endpoint.

4. The system in claim 1, wherein the instructions, when executed by the at least one processor, further cause the system to:
  determine that a number of calls to the destination endpoint during a predetermined amount of time is equal to or greater than a predetermined number; and
  determine the risk score based in part on the number of calls during the predetermined time period being equal to or greater than the predetermined number.

5. The system in claim 1, wherein the instructions, when executed by the at least one processor, further cause the system to:
  determine, at a first time, that the risk score meets or exceeds a threshold value;
  classify, based in part on the risk score meeting or exceeding the threshold value, the destination endpoint as the high risk destination endpoint; and
  determine, at a second time that is subsequent to the first time and based in part on the risk score being classified as the high risk destination endpoint, the trust score.

6. The system in claim 1, wherein the instructions, when executed by the at least one processor, further cause the system to:
  determine that a first calling rate associated with the destination endpoint is a threshold amount greater than second calling rates associated with one or more different destination endpoints;
  classify, based in part on the first calling rate being the threshold amount greater than the second calling rates, the destination endpoint as the high cost destination endpoint; and
  determine the risk score based in part on the destination endpoint being classified as the high cost destination endpoint.

7. The system in claim 1, wherein the instructions, when executed by the at least one processor, further cause the system to:
  determine one or more factors associated with the destination endpoint, the one or more factors including first calls to the destination endpoint outside of a predetermined range of hours, the destination endpoint being an unrecognized destination endpoint, and a duration of second calls to the destination endpoint being equal to or greater than a predetermined amount of time; and
  determine the risk score based in part on the one or more factors.

8. A computer implemented method comprising:
  receiving a connection request to initiate a connection between an origin endpoint and a destination endpoint that is remote from the origin endpoint over a network;
  identifying a customer account associated with the connection request;
  obtaining, based on the connection request, a trust score that indicates whether the connection request associated with the customer account is allowed, wherein the trust score is determined based in part on a risk score associated with connecting to the destination endpoint over the network and a pattern of previous voice connections of the customer account with one or more first destination endpoints categorized as a high risk destination endpoint and one or more second destination endpoints categorized as a high cost destination endpoint;
  determining whether the connection request associated with the customer account is allowed to initiate the connection with the destination endpoint based in part on the trust score; and
  initiating the connection with the destination endpoint over the network based in part on a determination that the connection request is allowed to initiate the connection with the destination endpoint based in part on the trust score.

9. The method in claim 8, further comprising:
  determining that the risk score of the destination endpoint meets or exceeds a threshold value; and
  identifying a condition linked to the customer account that the trust score be evaluated prior to allowing the connection with the destination endpoint.

10. The method in claim 8, wherein obtaining the trust score further comprises sending a trust score request to a scoring agent that generates the trust score using: (i) destination risk information for the destination endpoint, and (ii) customer status information and call history information linked to the customer account.

11. The method in claim 8, wherein obtaining the trust score further comprises:
  obtaining destination risk information, customer status information, and call history information linked to the customer account; and
  applying a rule set to the destination risk information, the customer status information, and the call history information to determine the trust score.

12. The method in claim 8, wherein obtaining the trust score further comprises:
  analyzing a customer call history linked to the customer account for the pattern of previous voice connections that meet or exceed a risk threshold; and
  generating the trust score based in part on matching the connection request to the pattern of previous voice connections.

13. The method in claim 8, wherein obtaining the trust score further comprises:
  training a machine learning model to generate trust scores that are classifications using training data that includes customer account features for a plurality of customer accounts and destination features for a plurality of destination endpoints;
  inputting one or more customer account features for the customer account and one or more destination features for the destination endpoint to the machine learning model; and
  determining, as an output from the machine learning model, a trust score classification for the customer account.

14. The method in claim 8, further comprising:
  receiving a second connection request to initiate a second connection between the origin endpoint and the destination endpoint over the network;
  determining that the second connection request to initiate the second connection with the destination endpoint is not allowed based in part on the trust score; and
  providing an indication that the second connection request is denied.

15. The method in claim 8, further comprising:
  receiving instructions to override a denial of the connection request; and
  initiating the connection with the destination endpoint.

16. The method in claim 8, further comprising:
  receiving an authorization code with instructions to override a denial of the connection request;
  validating the authorization code; and
  initiating the connection with the destination endpoint based in part on the authorization code being validated.

17. The method in claim 8, wherein the connection request is a call forwarding request that redirects a call from a first destination endpoint to a second destination endpoint.

18. The method in claim 8, wherein the connection request is sent by a communications application hosted on a client device, and the communications application includes functionality for calling destinations.

19. A non-transitory machine readable storage medium including instructions embodied thereon, wherein the instructions, when executed by at least one processor:
   receive a connection request to initiate a connection between an origin endpoint and a destination endpoint that is remote from the origin endpoint over a network;
   identify a customer account associated with the connection request;
   determine that a first calling rate associated with the destination endpoint is a threshold amount greater than one or more second calling rates associated with one or more different destination endpoints;
   classify, based in part on the first calling rate being the threshold amount greater than the one or more second calling rates, the destination endpoint as a high cost destination endpoint;
   determine a risk score associated with the destination endpoint based in part on the destination endpoint being classified as the high cost destination endpoint;
   obtain, based in part on the connection request and the risk score, a trust score for the customer account that indicates whether the connection with the destination endpoint is allowed for the customer account, wherein the trust score is determined based in part on matching the connection request to a pattern of customer connections to other destination endpoints;
   determine that the connection request associated with the customer account is allowed to initiate the connection with the destination endpoint based in part on the trust score; and
   initiate the connection with the destination endpoint over the network.

20. The non-transitory machine readable storage medium in claim 19, wherein the connection request is received at a communication service hosted in a service provider environment, and the communication service is scaled based in part on demand by launching and terminating computing instances used to host the communication service.

\* \* \* \* \*